(12) United States Patent
Rehill et al.

(10) Patent No.: US 11,541,811 B2
(45) Date of Patent: Jan. 3, 2023

(54) SET OF REAR VIEW ASSEMBLIES AND VEHICLE

(71) Applicant: MOTHERSON INNOVATIONS COMPANY LIMITED, London (GB)

(72) Inventors: Graham Rehill, Hampshire (GB); Andrew Lettis, Hampshire (GB); Andreas Herrmann, Stuttgart (DE); David Derry Chamberlain, Hampshire (GB); Callum Scott-Collins, Hampshire (GB)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/282,230

(22) PCT Filed: Oct. 4, 2019

(86) PCT No.: PCT/EP2019/076937
§ 371 (c)(1),
(2) Date: Apr. 1, 2021

(87) PCT Pub. No.: WO2020/070295
PCT Pub. Date: Apr. 9, 2020

(65) Prior Publication Data
US 2021/0347301 A1    Nov. 11, 2021

(30) Foreign Application Priority Data
Oct. 4, 2018   (EP) ..................................... 18198678

(51) Int. Cl.
*B60R 1/00*     (2022.01)
*B60R 1/06*     (2006.01)
(Continued)

(52) U.S. Cl.
CPC .................. *B60R 1/00* (2013.01); *B60R 1/06* (2013.01); *B60R 1/12* (2013.01); *H04N 5/2257* (2013.01);
(Continued)

(58) Field of Classification Search
CPC .... B60R 1/00; B60R 1/06; B60R 1/12; B60R 2001/1253; B60R 2300/306;
(Continued)

(56) References Cited

U.S. PATENT DOCUMENTS

2004/0233558 A1* 11/2004 Rehill ....................... B60R 1/06
                                                              359/879
2012/0154591 A1*  6/2012 Baur ......................... B60R 1/00
                                                              348/148
(Continued)

FOREIGN PATENT DOCUMENTS

JP      2014/061808 A      4/2014
JP      2014061808 A  *    4/2014
(Continued)

OTHER PUBLICATIONS

International Search Report dated Dec. 16, 2019 of International Application No. PCT/EP2019/076937.
(Continued)

*Primary Examiner* — Nasim N Nirjhar
(74) *Attorney, Agent, or Firm* — Jones Day

(57) ABSTRACT

A system of rear view assemblies for a vehicle includes at least one first rear view assembly mounted to a driver side of the vehicle to observe traffic conditions behind the driver side, at least one second rear view assembly mounted on a passenger side of the vehicle to observe traffic conditions behind the passenger side, and a vision system. A vehicle including such a system is also described.

13 Claims, 3 Drawing Sheets

(51) Int. Cl.
*B60R 1/12* (2006.01)
*H04N 5/225* (2006.01)
*H04N 5/247* (2006.01)
*H04N 5/232* (2006.01)

(52) U.S. Cl.
CPC ...... *H04N 5/247* (2013.01); *B60R 2001/1253* (2013.01); *B60R 2300/306* (2013.01); *B60R 2300/8026* (2013.01); *B60R 2300/8066* (2013.01); *H04N 5/23229* (2013.01)

(58) Field of Classification Search
CPC .... B60R 2300/8026; B60R 2300/8066; B60R 11/04; H04N 5/2257; H04N 5/247; H04N 5/23229
See application file for complete search history.

(56) References Cited

U.S. PATENT DOCUMENTS

| | | | |
|---|---|---|---|
| 2012/0161951 A1* | 6/2012 | Ito | B60Q 9/008 340/435 |
| 2014/0285666 A1* | 9/2014 | O'Connell | B60R 1/12 348/148 |
| 2018/0160030 A1 | 6/2018 | Chaney, Jr. et al. | |

FOREIGN PATENT DOCUMENTS

| | | |
|---|---|---|
| JP | 2016/037109 A | 3/2016 |
| WO | WO 2013/067082 A1 | 5/2013 |

OTHER PUBLICATIONS

Written Opinion dated Dec. 16, 2019 of International Application No. PCT/EP2019/076937.

* cited by examiner

SET OF REAR VIEW ASSEMBLIES AND VEHICLE

CROSS-REFERENCE TO RELATED APPLICATIONS

This application is a National Stage Entry of International Patent Application No. PCT/EP2019/076937, filed Oct. 4, 2019, which claims the benefit of foreign priority to European Patent Application No. EP 18198678.7, filed Oct. 4, 2018, each of which is hereby incorporated by reference herein in its entirety for all purposes.

BACKGROUND

1. Field of the Invention

The invention relates to a set of rear view assemblies to be mounted on a vehicle and to a vehicle comprising two rear view assemblies selected from this set of rear view assembles.

2. Related Art

A rearview device (or rear view mirror assembly) is a type of device generally fulfilling the legal requirements for rear view devices in vehicles, preferably motor vehicles. Therefore such a rear view device provides an image of the rear area, substantially as provided for example in the state-of-the-art using an interior mirror or a camera system and a display device, and of the lateral and backside areas lying diagonal to the sides, substantially as provided for example in the state-of-the-art using external rearview mirrors or camera systems and display devices, the image satisfying at least the legal requirements.

Such a rearview device within the subgroup of devices for indirect view and as such the tasks, aims and the solutions described in this invention can also be used for indirect view devices. Examples are images and views of objects which are not in the field of view of the driver, i.e. the directions opposing, left, right, below and above of the viewing direction, but also the view along the direction of the viewing direction of the driver and/or any combinations of the directions can be comprised. The view of the driver can be insufficient in particular also in the viewing direction, for example the view can be obstructed by vehicle parts of the vehicle itself, such as for example parts of the vehicle body, in particular the A-pillar, the roof construction and/or the engine hood, and the view can be obstructed by other vehicles and/or objects outside of the vehicle, obstructing the view in such a way that the driver can perceive the situation not completely satisfyingly or only incompletely. Additionally it is possible that the driver is not able to perceive the situation in or beside the viewing direction in such a way to allow him to control the vehicle according to the present situation. Therefore a rearview device can be adapted to reprocess the information according to the abilities of the driver to allow for a best possible perception of the situation.

Different functions and devices can be incorporated into and/or controlled with the help of rearview devices, comprising especially also cameras.

Especially useful are functions and devices to enhance, extend and/or sustain the functionality of the rearview device during normal or extreme conditions. This can comprise heating and/or cooling means, cleaning means such as wipers, liquid and/or gaseous sprays, actuator means for moving the rearview device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rearview devices comprise also illumination devices, for example any kind of light module like an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices can comprise for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device comprising an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REAR VIEW DEVICE AND MOTOR VEHICLE and claiming priority from European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority from German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rearview device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority from European patent application No. 3139711, filed on Sep. 3, 2015 for ELECTRONIC DEVICE AND REAR VIEW DEVICE which are all hereby incorporated herein by reference. A lighting device for a rearview device or a footwell device of a vehicle, comprising at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rearview device of a motor vehicle, comprising a logo lamp and a deflection mirror are disclosed in European patent application No. 3144183, filed on Sep. 13, 2016 for LIGHTING DEVICE, VEHICLE COMPONENT AND VEHICLE and claiming priority from German utility patent application No. 202015104894, filed on Sep. 15, 2015 for LIGHTING DEVICE, VEHICLE COMPONENT AND VEHICLE which are all hereby incorporated herein by reference. A display device for a motor vehicle and method for operating such a display device is disclosed in the European patent No. 2 830 305 B1, filed Jul. 24, 2013 for DISPLAY DEVICE FOR A MOTOR VEHICLE AND METHOD FOR OPERATING SUCH A DISPLAY DEVICE, which is hereby incorporated herein by reference.

The European patent EP 1 326 764 B1 describes a mirror system comprising a mirror support portion for supporting a mirror glass, where a portion forming part of the outside show surface of the assembled mirror continuous with an outer surface of a mirror cover interchangeably attached to the support portion, which is hereby incorporated herein by reference. The European patent EP 2 253 510 B1 describes a rear view mirror assembly with a least two parts out of the group of part as: mirror frame, mirror base, mirror housing, mirror bezel, mirror glass, mirror lighting means, actuator, that must be connected during assembly process with at least one retention latch. This retention latch comprises a circular hood and a rectangular arm formed in a first part and to be inserted into an opening and shifted along a slot in a second part, which is hereby incorporated herein by reference.

A camera module can comprise in particular a plurality of different optical elements, comprising a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can comprise for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It comprises for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference. An actuator device for a rearview device of a motor vehicle comprising at least one retaining element, an adjusting element, at least one driving means comprising at least one shape-memory element, and at least one heat-conducting means is described in U.S. patent application Ser. No. 15/165,417, filed May 26, 2016 for ACTUATOR DEVICE FOR A REARVIEW DEVICE OF A MOTOR VEHICLE and claiming priority from European patent No. 3 098 444 B1, filed on May 29, 2015, for ACTUATOR FOR A REAR VIEWING DEVICE OF AN AUTOMOBILE, which are all hereby incorporated herein by reference. An adjustment unit for a rear view device for a vehicle, with a pivot, with a carrier mounted moveable, in particular tiltable, to the pivot, with at least one first bending actuator, which has its largest dimension in a first direction, which is adjustable bendable angular or crosswise to the first direction, which is fixed with a first end to a first fastening means and which is fixed with a second end to the carrier, and with at least one second bending actuator, which has its largest dimension in a second direction angular or crosswise to the first direction, which is bendable angular or crosswise to the second direction, which is fixed with a first end to the first fastening means or to a further fastening means and which is fixed with a second end to the carrier, wherein a bending of the first bending actuator and/or of the second bending actuator effects a movement of the carrier, a rear view device with such an adjustment unit and a vehicle with such an adjustment unit and/or such a rear view device are disclosed in U.S. patent application Ser. No. 15/153,106 filed May 12, 2016 for ADJUSTMENT UNIT, REAR VIEW DEVICE AND VEHICLE, claiming priority from European patent No. 3 093 195 B 1, filed on May 12, 2015 for ADJUSTMENT UNIT, REAR VIEW DEVICE AND VEHICLE, which are all hereby incorporated herein by reference. An adjustable rearview device for a motor vehicle including a mirror head, a mirror base and at least one joint device which is arranged between the mirror head and mirror base and comprises at least one elastomeric element and an axis of rotation around which the mirror head can move, particularly rotate or fold relative to the mirror base, from a first functional position, in which the elastomeric element holds the mirror head, into at least one second functional position in which the elastomeric element is stretched or compressed, further having at least one electrical conductor, which extends at least between the mirror base and mirror head and through which electrical energy can be transported wherein the at least one electrical conductor is elastically deformable at least in the direction of its longitudinal dimension, a method for manufacturing such a rearview device and a motor vehicle having such a rearview device are disclosed in U.S. patent application Ser. No. 15/152,054, filed on May 11, 2016 for ADJUSTABLE REARVIEW DEVICE, METHOD AND MOTOR VEHICLE and claiming priority from European patent application No. 15167444.7, filed May 12, 2015 for VERSTELLBARE RÜCKBLICKVORRICHTUNG, VERFAHREN UND KRAFTFAHRZEUG, which are all herby incorporated herein by reference. A sliding clutch for an adjustment device of a rearview device of a motor vehicle comprising: a first plastic part formed as an external gear wheel having a first multiplicity of first coupling elements; and a second plastic part formed as an internal shaft having a second multiplicity of second coupling elements, the first and second plastic parts rotate with one another up to a predefined maximum torque and a positive fit exists between the first and second coupling elements up to the predefined maximum torque, and wherein the first plastic part is made of a plastic material having higher elasticity than a plastic material of the second plastic part, and a side-view mirror for a motor vehicle having an adjustment device which comprises such a sliding clutch is disclosed in U.S. patent application Ser. No. 15/252,708, filed Aug. 31, 2016 for SLIDING CLUTCH FOR AN ADJUSTMENT DEVICE AND SIDE-VIEW MIRROR FOR A MOTOR VEHICLE HAVING AN ADJUSTMENT DEVICE, claiming priority from European patent application No. 15183334.0, filed Sep. 1, 2015 for RUTSCHKUPPLUNG FÜR EINE VERSTELLVORRICHTUNG UND AUSSENSPIEGEL FÜR EIN KRAFTFAHRZEUG MIT EINER VERSTELLVORRICHTUNG, which are all herby incorporated herein by reference.

Still further, the camera module can also comprise cleaning elements to clean the optical element facing outwards and being exposed to the environment. The cleaning element can for example comprise wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example comprise any fabric, elastomeric, sponge, brush, or combination of these. Special wiper elements comprising wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference. An exterior review device for a motor vehicle and a sealing element for sealing an aperture of a wall element of an exterior rearview device is disclosed in the German patent No. 10 2012 107 680 B3, filed on Aug. 21, 2012 for AUSSENRÜCKBLICKANORDNUNG FÜR EIN KRAFTFAHRZEUG UND DICHTUNGSVORRICHTUNG, which is hereby incorporated herein by reference. A sealing device for a rear view device, such as an inside or outside mirror or camera, of a motor vehicle, which can be arranged between a foot part and a head part that can be rotated relative to the foot part from a normal position into at least one fold-in position about an axis of rotation, having at least one sealing means, which can be or is fixed to the foot part or the head part and which can be or is arranged in a sealing arrangement in which it is in contact with the foot part and the head part and closes a gap existing between the foot part and the head part and in addition a rear view device having such a sealing device are disclosed in U.S. patent application Ser. No. 15/314,390, filed May 8, 2015 for SEALING DEVICE, REAR-VIEW DEVICE, AND MOTOR VEHICLE claiming priority from European patent No. 2 949 512 B1, filed May 27, 2014 for SEALING DEVICE, REAR VIEWING DEVICE AND MOTOR VEHICLE, which are all hereby incorporated herein by reference.

A rear view element folding device for a motor vehicle for approaching at least one pivot position of an element housing relative to an element foot that can be mounted on the motor vehicle, and for locking or unlocking at least one resting position of the element housing relative to the element foot as well as a method for triggering such a rear view element folding device are disclosed in U.S. patent application Ser. No. 15/349,657, filed on Nov. 11, 2016 for REAR VIEW ELEMENT FOLDING DEVICE and European patent application No. 16197212.0, filed on Nov. 4, 2016 for RÜCKBLICKELEMENT-KLAPPVORRICH-TUNG, both claiming priority to German utility patent application No. 20 2015 106 118.8 filed on Nov. 12, 2015, which are all hereby incorporated herein by reference.

Additionally or alternatively, the housing can be made of a body comprising plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

An electronic circuit board unit for an electronic module installed in a vehicle rear view device, with an, essentially plane, base plate, comprising at least one driver circuit, with a first connector for directly or indirectly connecting the base plate with at least one power supply, with at least one, essentially plane, printed circuit board, which is disposable or disposed parallel, angular or cross to the base plate and which is spaced to the base plate, in particular in a manner having no direct contact to the base plate, with at least one plug connection for electronically and physically connecting between the printed circuit board and the base plate, and with at least one first receiver for mounting an electronic consumer unit of the electronic module and being attachable or attached to the base plate or to one of the at least one printed circuit board, wherein at least one second connector attachable or attached to the base plate or to the at least one printed circuit board for connecting at least one further electronic consumer unit of the electronic module to the driver circuit of the base plate, such that either n printed circuit boards and n+1 of electronic consumer units are comprised, with n being an integer number of 1 and above, or a plurality of printed circuit boards is provided, with each circuit board comprising at least one first receiver and at least one second connector is disclosed in U.S. patent application Ser. No. 15/256,537, filed Sep. 3, 2016 for ELECTRONIC CIRCUIT BOARD UNIT, ELECTRONIC MODULE AND REAR VIEW DEVICE FOR A VEHICLE and claiming priority from European patent application No. 15183741.6, filed Sep. 3, 2015 for ELECTRONIC CIRCUIT BOARD UNIT, ELECTRONIC MODULE AND REAR VIEW DEVICE FOR A VEHICLE, which are all hereby incorporated herein by reference.

The camera module can comprise a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on Jul. 16, 2008 for RECORDING DEVICE FOR RECEIVING, PROCESSING AND STORING IMAGE FILES IN A VEHICLE AND METHOD, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference. A method for processing input image data by an image processing device, to achieve a desired visual effect within the output image, wherein input image data are stored within an input memory device and the input image data are transferred based on data of a lookup table into respective output image data stored within an output memory device, the lookup table being generated based on at least one data remapping function is disclosed in U.S. patent application Ser. No. 14/891,548, filed on May 13, 2014 for METHOD AND DEVICE FOR PROCESSING INPUT IMAGE DATA and claiming priority from European patent application No. 13168085.2, filed on May 16, 2013 for METHOD AND DEVICE FOR PROCESSING INPUT IMAGE DATA, which are all hereby incorporated herein by reference.

Rear view mirror assemblies have to fulfill the legal requirements for rear view mirror assemblies in vehicles, preferably motor vehicles, with respect to the size of the provided field of view. The rear view mirror assembly on the driver side could be smaller than on the passenger side due to the smaller distance between driver and rear view mirror on the driver side to fulfill the legal requirements according to regulation 46 with respect to the minimum field of view to be provided. However, the external appearance of a vehicle would suffer if the exterior mirrors were to be asymmetrically sized, which is why the same size exterior mirrors are used in all vehicle types, whereby the size of the driver's mirror is determined by the legally required larger exterior mirror on the passenger side and is therefore oversized. Exterior mirrors that are larger than necessary have a negative effect on the air resistance, noise and the weight of the vehicle and thus on its performance.

DE 10 2008 035 429 A1 provides a monitoring device for monitoring rearward traffic conditions in front and rear of the vehicle, where the device comprises an image detection unit, which is integrated into one of longitudinal sides of the vehicle. The image detection unit replaces the exterior rear view mirrors on driver and passenger side and is connected with a driver assistance system by a data processing unit, where the driver assistance system is controllable based on data determined from the traffic conditions. The image detection unit is connected with an output unit in the interior of the vehicle by a data processing unit. The disadvantage of such system is that in case of a malfunction of the monitoring device the driver as no possibility to observe the traffic behind the vehicle from his common driver position.

JP 2014 061808 A discloses a rearward visual recognition apparatus capable of performing rearward and rearward lateral visual recognition including a mirror, and reflects at least a part of predetermined areas in the rearward and rearward lateral sides of a vehicle, which is imaged by a camera, in a direction of a driver seat. Thus, even when the camera gets out of order, the rearward visual recognition apparatus can perform rearward and rearward lateral visual recognition by the mirror.

JP 2016037109 A discloses a rear visual recognition device that can improve aerodynamic performance comprising a camera, a spare mirror, a support shaft fixed to a door, and a movable housing which holds the camera and spare mirror, and is supported by the support shaft rotatably on the center of the support shaft. The movable housing is movable between a camera position where the camera can photograph the oblique rear of a vehicle and a mirror position where the oblique rear of the vehicle is reflected in the spare mirror when viewed from a driver's seat of the vehicle. Further, the movable housing is such that front projection area at the camera position is smaller than front projection area at the mirror position.

WO 2006/104317 A1 discloses reflecting mirrors composed of a many-sided mirror for reflecting side front, side rear and side lower views and installed to suitable positions of both sides of a vehicle, wherein additionally cameras are installed to both sides of the vehicle so that an image reflected by each reflecting mirror is input thereto, and monitors installed to both front sides of a driver seat to display the image input to the cameras. This system allows a driver to ensure a visual field required for driving or parking without intentionally looking at the rearview mirror and thus to drive a vehicle in a more convenient and safer way. In addition, if the camera and the reflecting mirrors have small sizes, air noise caused in high-speed driving is reduced to give an agreeable indoors circumstance, and air resistance is reduced to reduce energy consumption.

US 2014/0333770 A1 discloses a rearview vision system for a vehicle including a reflective element disposed at a driver or passenger side portion of a vehicle and a camera disposed at or near the reflective element and having a field of view that encompasses at least a portion of the reflective element. The camera and the reflective element are disposed at the side portion of the vehicle so that images of the scene occurring to the side and rear of the vehicle are reflected off of the reflective element and viewed by the camera. The camera captures image data for display of images by a display device that is viewable by a driver of the vehicle when normally operating the vehicle so as to provide the driver with a generally sideward and rearward field of view.

WO 2013/067082 A1 discloses a vision system for a vehicle includes an exterior rearview mirror assembly mounted at an exterior portion of a door of a vehicle, an imaging sensor having a field of view exterior the vehicle and a video display screen operable to display video images captured by the imaging sensor. The video display screen is disposed at an interior portion of the vehicle door at which the exterior rearview mirror assembly is mounted. The exterior rearview mirror assembly and the video display screen may be part of a mirror and display module that is mountable at the vehicle door as a unit. The camera may be disposed at the exterior rearview mirror assembly.

It would be desirable to have a set of exterior rear view assemblies available which would overcome the disadvantages of the state of the art. According to one aspect of the invention it is desirable to have a set of exterior rear view assemblies having a positive effect on the performance of the vehicle but still providing a backup system for observing the traffic conditions behind. According to another aspect of the invention it is desirable to have a set of exterior rear view assemblies with a modular design allowing a common fit such that a customer can select between different rear view assemblies, depending on personal preferences, in particular regarding design, comfort, security and drive assistance features.

SUMMARY

It is an object of the invention to provide a set of exterior mirrors having a positive effect on the performance of the vehicle but still providing a backup system for observing the traffic conditions behind.

This problem is solved by a set of rear view assemblies for a vehicle comprising:
  at least one first rear view assembly to be mounted to a driver side of the vehicle to observe traffic conditions behind on the driver side, comprising a first base assembly and a first head assembly mounted on the first base assembly, where the first head assembly comprises a mirror element having a first size being a minimum size still fulfilling the legal requirements for provided a mirror-based field of view on the driver side, and
  at least one second rear view assembly to be mounted on a passenger side of the vehicle to observe traffic conditions behind on the passenger side, comprising a second base assembly and a second head assembly mounted on the second base assembly, where the second head assembly comprises a mirror element having second size being the same minimum size as the one of the first head assembly of the first rear view assembly,
  a vision system at least comprising a vision sensor and a display, where the vision sensor is arranged in the second rear view assembly to record an image of the traffic conditions behind on the passenger side to be displayed to a driver by the display with a field of view adapted to meet the legal requirements for the mirror-based field of view on the passenger side regardless on the reduced size of the second head assembly of the second rear view assembly,
  wherein the first rear view assembly on the driver side and the second rear view assembly on the passenger side are reduced to a size adapted to the smaller field of view on the driver side resulting in smaller rear view assemblies having to carry smaller mirror elements.

The driver and passenger field of view requirements for passenger vehicles determine mirror glass height and mirror proportions, which defines the corresponding dimensions of the head assembly carrying the mirror element. The field of view which must be present on a rear view mirror is given by a so-called rhombus (see also FIG. 2, where the rhombus is denoted as FOV-21 and FOV-22) according to the regulation 46 of the Economic Commission for Europe of the United Nations (UNECE)—Uniform provisions concerning the approval of devices for indirect vision and of motor vehicles with regard to the installation of these devices—specifying the vehicle requirements with respect to safety, among other the minimum height and width of the rear view mirrors of vehicles. The field of view (rhombus) on the passenger side is larger than the field of view on the driver side, since the distance between driver and rear view mirror is larger when viewing the rear view mirror on the passenger side. Since the size of rear view mirrors is desired as to be symmetrical for driver and passenger side, the passenger rhombus dictates the size of the rear view mirror also on the driver side. The present inventions still fulfills the demand of providing symmetrical rear view assemblies for driver and passenger sides, but applies a vision sensor on the passenger side to get another degree of freedom with respect to the size of the rear view assemblies. When displaying the field of view on the passenger side via a display to the driver, the larger rhombus of the passenger side no longer dictates the size of the rear view assembly on the driver side. Now the rear view assembly on the driver side can be reduced to a size adapted to the smaller rhombus for the driver side resulting in a much smaller rear view assembly, especially in a much smaller first head assembly only having to carry a much smaller mirror element. The field of view on the passenger side is recorded by a vision sensor and displayed on a display, where the image content covers the traffic conditions behind with the legally required field of view, since the image size can be adapted electronically. The vision sensor at least on the passenger side provides additional functionality to the rear view assembly at least on the passenger side. Therefore the rear view assemblies can be minimized to the minimum size required for the driver side resulting in a much smaller set of rear view assemblies to be mounted on vehicles. Such set of rear view assemblies according to the present invention improves the air resistance, noise and the weight of the vehicle and thus on its performance while maintaining a backup solution to be able to observer the traffic conditions behind the vehicle even in case of a malfunction of the vision system providing a failure-safe sensor condition, because the rear view assemblies still comprise mirror elements providing a field of view of the traffic behind, which is somewhat smaller on the passenger side, but still observable from a common driver position without any need for the driver to turn around and look to the back of his vehicle.

The vision system may comprise further components in addition to the vision sensor and the display. Preferably, the vision system includes a data processing unit for image processing. The vision system can also be connected to a driver assistance system, which determines a traffic situation from the collected data and, if necessary, controls warning systems in the vehicle, some of which can also be accommodated in the rearview mirror assembly as accessories.

The display might be a LCD or OLED screen or other screens. The display can be mounted at any position in the passenger compartment that is suitable for the driver, for example in or on the dashboard or on the inside of the passenger front door, for example in the area of the A-pillar.

The vision sensor might be any sensor suitable to record a scenery, here the traffic condition behind or on the side of the vehicle (passenger side, eventually also driver side). The vision sensor can be connected to the vehicle's electrical system via any bus system or via a separate cable connection.

The set of rear view assemblies according to the present invention provides a positive effect on the performance of the vehicle but is still operational as a backup system for observing the traffic conditions behind.

In an embodiment the vision sensor is arranged in the second base assembly or in the second head assembly. The vision sensor may be attached to the frame structure of the base assembly or head assembly. Both base and head assemblies provide enough space to integrate the vision sensor in it.

In another embodiment the vision sensor is arranged behind the mirror element of the second head assembly to record the traffic conditions through the rear view mirror. Here the vision sensor is encapsulated by the housing of the second head assembly, where the mirror element is mounted to. The encapsulation prevents the vision sensor from environmental influences keeping the vision sensor clean and operational at any whether conditions.

In another embodiment the mirror element comprises at least one area being at least semitransparent, where the vision sensor is arranged behind this area. A semitransparent area within the line of view of the vision sensor enables the vision sensor to observe and record the traffic behind in images having good image quality.

In another embodiment the vision system comprises at least one further vision sensor and a further display, where the further vision sensor is arranged in the first rear view assembly to record an image of the traffic conditions behind on the driver side to be displayed to the driver by the display.

The further vision sensor can be arranged in the first base assembly or in the first head assembly. This allows to further reduce the size of the rear view assemblies, because in this case, the size of the mirror element in the first head assembly of the driver side is also not dictated anymore by the rhombus size for the driver side according to regulation 46. Here the first head or base assembly only has to provide enough space to house the vision sensor.

In another embodiment the further vision sensor is arranged behind the mirror element of the first head assembly to record the traffic conditions through the rear view mirror for the same reasons as described for the second rear view assembly.

In another embodiment the mirror element comprises at least one area being at least semitransparent, where the further vision sensor is arranged behind this area for the same reasons as described for the second rear view assembly.

In another embodiment the vision sensor is a camera. For example, a video camera with a wide-angle lens can be used, whereby the camera in one version can include a super-wide-angle lens or a fisheye lens. Small cameras fitting into base or head assemblies are available.

In another embodiment the vision system is adapted to run a software for correcting the image recorded by the vision sensor to the provided the image with the required field of view in the display. Image correction allows to display an image of the right size comparable to the rhombus for passenger size according to regulation 46. Furthermore different image sensors can be installed, where the displayed images can be processed in a way delivering the same images and qualities regardless the used vision sensor and its current status, e.g. with respect to component life time and/or cleanliness status.

In another embodiment the first and/or the second rear view assembly comprises further accessories to be utilized separately to the vision sensor, since the space within the rear view assembly is partly unoccupied and may accommodate additional components. Such accessories might by a downward facing camera and/or a sideward facing camera and/or a forward facing camera, a turn signal indicator, a blind spot indicators, a light source or a display, a logo light, a bottom light, a position light, a compass sensor, a tire pressure monitoring system, a passenger air bag status or a garage door opening system or a telematics system, global positioning system (GPS) or cellular phone antenna or the like.

In another embodiment the first and second rear view assemblies are head-mover assemblies with mirror elements fixed to a housing of the first and second head assemblies. This reduces the number of components required within the head assembly in order to move the rear view assembly to adjust the working position of the rear view assemblies.

In further embodiments the modular concept is stressed by providing a plurality of first head assemblies. Said plurality of first head assemblies can comprise a first head assemblies in form of a head-mover assembly with at least one mirror element fixed to a housing of the first head assembly, a second first head assembly with the further vision sensor, and/or a third first head assembly with further accessories. Further the plurality of first head assemblies can comprise different first head assemblies having different functionalities, geometries and/or designs, with each first head assembly being adapted to be mounted to the first base assembly.

In still further embodiments the modular concept is further stressed by providing a plurality of second head assemblies. Said plurality of second head assemblies can comprise a first second head assemblies in form of a head-mover assembly with at least one mirror element fixed to a housing of the second head assembly, and/or a second first head assembly with further accessories. Further the plurality of second head assemblies can comprise different second head assemblies having different functionalities, geometries and/ or designs, with each second head assemblies being adapted to be mounted to the second base assembly.

Each first head assembly having different functionalities, geometries and/or designs can be provided in a first version for the driver side being on the left side of the vehicle and in a second version for the driver side being on the right side of the vehicle, and each second head assembly having different functionalities, geometries and/or designs can be provided in a first version for the passenger side being on the right side of the vehicle and in a second version for the passenger side being on the left side of the vehicle.

In another embodiment the first base assembly for the driver side being on the left side of the vehicle corresponds to the second base assembly for the passenger side being on the left side of the vehicle, and the first base assembly for the driver side being on the right side of the vehicle corresponds to the second base assembly for the passenger side being on the right side of the vehicle.

Thus, with only two base assemblies, which are symmetrically to each other, and a plurality of first as well as a plurality of second head assemblies a modular system is provided which ensures a high degree of flexibility when configuring rear view assemblies and even vehicles.

The first and second base assemblies can be symmetrical. The first and second head assemblies can be symmetrical, in particular when having the same functionalities, geometries and sizes.

The invention relates further to a vehicle comprising first and second rear view assemblies selected from a set of rear view assemblies according to the present invention. Accordingly a first head assembly of the first rear view assembly has a minimum size still fulfilling the legal requirements for provided a mirror-based field of view on the driver side, and a second head assembly of the second rear view assembly has the same minimum size as the first head assembly of the first rear view assembly, where a vision system provides an image of the traffic conditions behind on the passenger' side with a field of view adapted to meet the legal requirements for the mirror-based field of view on the passenger side regardless on the reduced size of the second head assembly of the second rear view assembly. The vehicle might be any type of vehicles, where rear view assemblies are used.

The vehicle comprising the set of rear view assemblies according to the present invention have a better performance, e.g. with respect to air resistance, noise and the weight of the vehicle and is still operational with the rear view assemblies itself as a backup system for observing the traffic conditions behind.

In an embodiment the first base assembly and the second base assembly are attached to the body of the vehicle, and the first head assembly being selected from the plurality of first heads assemblies is mounted on the first base assembly, preferably in an exchangeable manner, and/or the second head assembly being selected from the plurality of second head assemblies is mounted on the second base assembly, preferably in an exchangeable manner. This ensures a configuration freedom.

The above listed embodiments can be used individually or in any combination to provide the device and the process in accordance with the invention.

BRIEF DESCRIPTION OF THE DRAWINGS

These and other aspects of the invention are shown in detail in the illustrations as follows.

DETAILED DESCRIPTION

Figure 1:
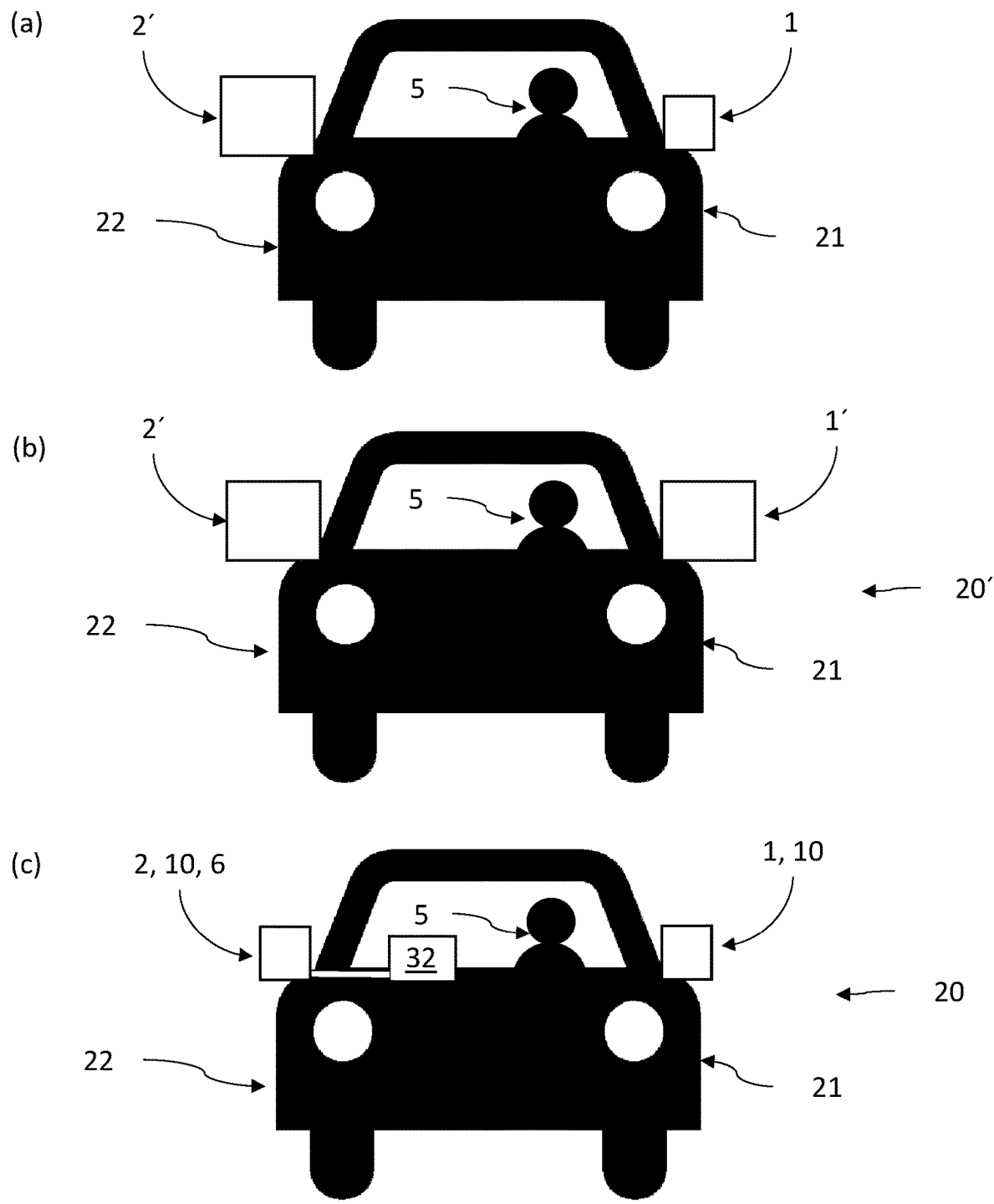
FIG. 1 is a schematic view of vehicles with rear view assemblies on passenger and driver side (a) with individual minimum sizes for driver and passenger sides, (b) with common size according to prior art, and (c) with minimized sizes according to the present invention.

FIG. 1 shows a schematic view of vehicles 20, 20' with rear view assemblies 1, 1', 2, 2' on passenger side 22 and driver side 21 (a) with different individual minimum sizes for driver and passenger sides 21, 22, (b) with common size according to prior art, and (c) with minimized sizes according to the present invention. The driver side 21 is indicated by the driver 5. The vehicle according to FIG. 1a comprises first and second rear view assemblies 1, 2' of different but minimized sizes, where the first rear view assembly 1 has a smaller size than the second rear view assembly 2' due to the rhombus of the field of view according to regulation 46 being larger for the passenger side 22 than for the driver side 21. FIG. 1b shows a vehicle 20' according to prior art, where the sizes of the rear view assemblies and 2' are the same but dictated by the larger rhombus for the required field of view FOV-22 on the passenger side 22. FIG. 1c shows a vehicle 20 according to the present invention comprising a set of rear view assemblies 10 with first and second rear view assemblies 1, 2, where a first head assembly 1b of the first rear view assembly 1 has a minimum size still fulfilling the legal requirements for provided a mirror-based field of view FOV-21 on the driver side 21, and where a second head assembly 2b of the second rear view assembly 2 has the same minimum size as the first head assembly 1b of the first rear view assembly 1, where a vision system 3 provides an image of the traffic conditions behind on the passenger side 22 displayed on a display 32 connected to the second rear view assembly 2 with a field of view adapted to meet the legal requirements for the mirror-based field of view FOV-22 on the passenger side 21 regardless on the reduced size of the second head assembly 2b of the second rear view assembly 2. The image might be recorded by a camera as the vision sensor 31 (see FIG. 3). Here the first and/or the second rear view assembly 1, 2 may comprise further accessories 6 to be utilized separately to the vision sensor 31. The first and second rear view assemblies 1, 2 may also be head-mover assemblies with mirror elements 4 fixed to a housing of the first and second head assemblies 1b, 2b.

Figure 2:
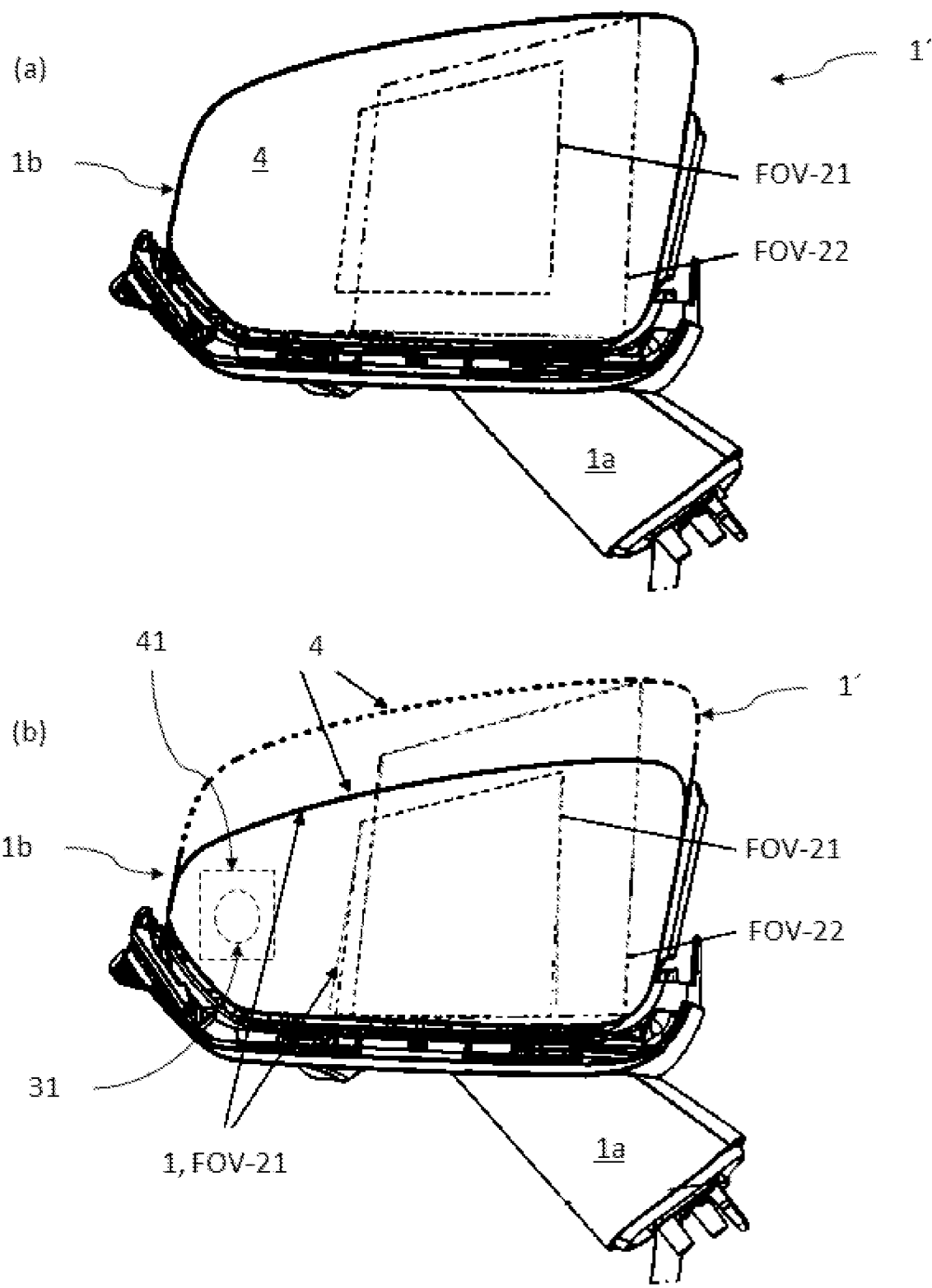
FIG. 2 is a field of view rhombus according to regulation 46 for the first rear view assembly on the driver side (a) according to prior art, and (b) according to the present invention.

FIG. 2 shows the field of view rhombus according to regulation 46 as an example for the first rear view assembly 1 on the driver side 21 (a) according to prior art, and (b) according to the present invention. The rear view assembly 1 comprises a first base assembly 1a, where the head assembly 1b is mounted to. The base assembly 1a is mounted to the vehicle as indicated by the protrusions shown at the lower end of the base assembly 1a. FIG. 2a shows an existing common rear view assembly, here as a first rear view assembly for the driver side 21. However the rear view assembly for the passenger side 22 is identical, but only laterally reversed. The mirror element 4, here a glass mirror, has a glass size fulfilling both driver and passenger field of view requirements FOV-21, FOV-22. The corresponding rhombus fits into the mirror element 4 as indicated by the dashed lines, the larger one for the field of view FOV-22 for the passenger side 22, the smaller one for the field of view FOV-21 for the driver side 21. FIG. 2b shows the minimized size of the first head assembly 1b of the first rear view assembly 1 (solid line of the mirror element 4) in comparison to the larger size when trying to also cover the rhombus for the field of view FOV-22 for the passenger side (dashed line of the mirror element 4). The first head assembly 1b according to the present invention just covers the rhombus for the field of view FOV-21 for the driver side 21, while the rhombus for the passenger side 22 is partly outside the area of the mirror element 4. The same small rear view assembly 2 is used also for the passenger side 22, where the vision sensor 31 and the display 32 record and display the field of view FOV-22 according to the legal requirements separate from the second rear view assembly 2 to be conform with the legal requirements. In FIG. 2b another vision sensor 31 is additionally arranged in the first head assembly 1b wherein the vision sensor 31 is arranged behind the mirror element 4 of the first head assembly 1b to record the traffic conditions through the rear view mirror 4, where the mirror element 4 comprises at least one area 41 being at least semitransparent, where the vision sensor 31 is arranged behind this area 41. What is shown here for the first rear view assembly 1 and the arrangement of the vision sensor 31 also applies for the second rear view assembly 2.

Figure 3:
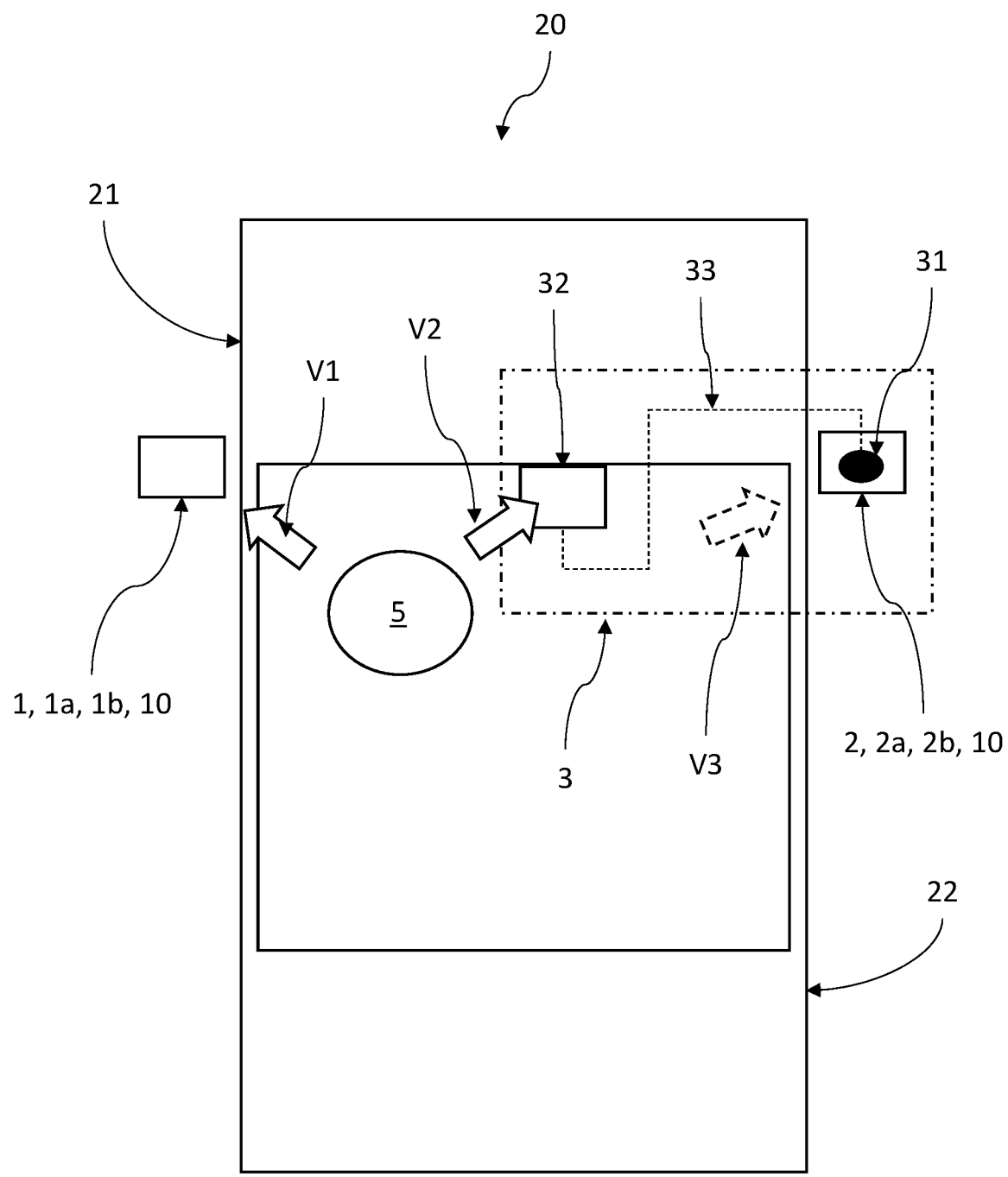
FIG. 3 is a schematic view of a vehicle with a set of rear view assemblies according to the present invention.

FIG. 3 shows a schematic view of a vehicle with a set of rear view assemblies according to the present invention. A set of rear view assemblies 10 is mounted on a vehicle 20, where a first rear view assembly 1 is mounted to the driver side 21 of the vehicle 20 to observe traffic conditions behind on the driver side 21 comprising a first base assembly 1a and a first head assembly 1b mounted on the first base assembly 1a (see FIG. 2), where the first head assembly comprises a mirror element 4 (see FIG. 2) having a minimum size still fulfilling the legal requirements for provided a mirror-based field of view FOV-21 on the driver side 21, and where a second rear view assembly 2 is mounted on the passenger side 22 of the vehicle 20 to observe traffic conditions behind on the passenger side 22 comprising a second base assembly 2a and a second head assembly 2b mounted on the second base assembly 2a, where the second head assembly 2b comprises a mirror element 4 having the same minimum size as one of the first head assembly 1b of the first rear view assembly 1, and a vision system 3 is connected to the second rear view assembly 2 at least comprising a vision sensor 31 and a display 32, where the vision sensor 31 is arranged in the second rear view assembly 2 to record an image of the traffic conditions behind on the passenger side 22 to be displayed to the driver 5 by the display 32 with a field of view adapted to meet the legal requirements for the mirror-based field of view FOV-22 on the passenger side 21 regardless on the reduced size of the second head assembly 2b of the second rear view assembly 2. The driver 5 can observe the traffic behind on the driver side 21 by a driver's view V1 to first rear view assembly 1, the traffic behind on the passenger side 22 by a driver's view V2 to display 32 showing the field of view FOV-22 of second rear view assembly 2 and optionally by a driver's view V3 (dashed arrow) to the second rear view assembly 2. The vision sensor 31 can be arranged in the second base assembly 2a or in the second head assembly 2b. The vision sensor 31 might be arranged behind the mirror element 4 of the second head assembly 2b to record the traffic conditions through the rear view mirror 4. The mirror element 4 may comprise at least one area 41 being at least semitransparent, where the vision sensor 31 is arranged behind this area 41. The vision sensor 31 might be a camera. The vision sensor 31 and the display 32 and eventually additional components of the vision system 3 not shown here are electrically connected to each other by an electrical connection 33, which might by a bus system insight the vehicle. An additional component of the vision system 3 might by a controller to calculate the image content to be displayed based on the signals received from the vision sensor(s) 3. The controller may also control accessory installed in the rear view assemblies 1, 2 or being adapted to run a software for correcting the image recorded by the vision sensor 31 to the provided the image in the display 32 with the required field of view.

The embodiments shown here are only examples of the present invention and must therefore not be understood as restrictive. Alternative embodiments considered by the skilled person are equally covered by the scope of protection of the present invention.

LIST OF REFERENCE NUMERALS 1 first rear view assembly according to the invention
1' first rear view assembly according to prior art
1a base assembly of the first rear view assembly
1b head assembly of the first rear view assembly
2 second rear view assembly according to the invention
2' second rear view assembly according to prior art
2a base assembly of the second rear view assembly
2b head assembly of the second rear view assembly
3 vision system 31 vision sensor, e.g. a camera
32 display
33 electrical connection
4 mirror element
41 at least semitransparent area of the rear view mirror
5 driver
6 accessory
10 set of rear view assemblies according to the invention
20 vehicle according to the invention
20' vehicle according to prior art
21 driver side
22 passenger side
FOV-21 field of view of first rear view assembly (driver side)
FOV-22 field of view of second rear view assembly (passenger side)
V1 driver's view to the first rear view assembly
V2 driver's view to the display showing field of view of second rear view assembly
V3 driver's view to the second rear view assembly

What is claimed is:

1. A system of rear view assemblies for a vehicle, comprising:
at least one first rear view assembly mounted to a driver side of an exterior of the vehicle to observe traffic conditions behind the driver side, comprising:
a first base assembly; and
a first head assembly mounted on the first base assembly, the first head assembly comprising a mirror element having a first size being a minimum size fulfilling a legal requirement for providing a mirror-based field of view on the driver side;
at least one second rear view assembly mounted on a passenger side of the exterior of the vehicle to observe traffic conditions behind the passenger side, comprising:
a second base assembly; and
a second head assembly mounted on the second base assembly, the second head assembly comprising a mirror element, the mirror element of the second rear view assembly mounted on the passenger side having a second size being the same minimum size as the first size of the mirror element of the first head assembly of the first rear view assembly mounted to the driver side; and
a vision system, comprising:
at least one vision sensor;
a display located in an interior of the vehicle, and
a controller;
wherein the vision sensor is arranged in the second rear view assembly to record a recorded image of the traffic conditions behind the passenger side, the recorded image based on the signals received by the at least one vision sensor;
wherein the controller includes software configured to calculate a display image to be displayed to a driver by the display, the calculation of the display image based on the recorded image and a legal requirement for the mirror-based field of view on the passenger side, the display configured to display the display image and having a field of view adapted to meet the legal requirement for the mirror-based field of view on the passenger side regardless of the reduced size of the second head assembly of the second rear view assembly so that the first rear view assembly on the driver side and the second rear view assembly on the passenger side are reduced to the first size, the first size being adapted to a smaller field of view on the driver side resulting in the smaller rear view assemblies carrying smaller mirror elements.

2. The system of claim 1, wherein at least one of:
the vision sensor is arranged in the second base assembly or in the second head assembly,
the vision sensor is arranged behind the mirror element of the second head assembly to record the traffic conditions through the rear view mirror, or
the mirror element comprises at least one area being at least semitransparent, the vision sensor being arranged behind the at least one area.

3. The system of claim 1, wherein the vision system comprises at least one further vision sensor and a further display, where the further vision sensor is arranged in the first rear view assembly to record an image of the traffic conditions behind the driver side to be displayed to the driver by the further display.

4. The system of claim 3, wherein at least one of:
the further vision sensor is arranged in the first base assembly or in the first head assembly,
the other vision sensor is arranged behind the mirror element of the first head assembly to record the traffic conditions through the rear view mirror, or
the mirror element comprises at least one area being at least semitransparent, where the other vision sensor is arranged behind this area.

5. The system of claim 1, wherein at least one of:
each vision sensor is a camera, or
the vision system is adapted to run a software for correcting the image recorded by each vision sensor to provide the image in the display with the required field of view.

6. The system of claim 5, wherein at least one of the first and the second rear view assembly comprises further accessories to be utilized separately to the vision sensor.

7. The system of claim 1, wherein at least one of:
a plurality of first head assemblies are provided, the plurality of first head assemblies comprising at least one of:
a primary first head assembly which is a head-mover assembly with at least one mirror element fixed to a housing of the first head assembly,
a secondary first head assembly with the further vision sensor, or
a tertiary first head assembly with further accessories; or
a plurality of first head assemblies are provided, the plurality of first head assemblies comprising different first head assemblies having one or more of different functionalities, geometries, or designs, with each first head assembly being adapted to be mounted to the first base assembly.

8. The system of claim 1, wherein at least one of:
a plurality of second head assemblies are provided, the plurality of second head assemblies comprising at least one of:
a primary second head assembly which is a head-mover assembly with at least one mirror element fixed to a housing of the second head assembly; or
a secondary second head assembly with further accessories; or
a plurality of second head assemblies are provided, the plurality of second head assemblies comprising different second head assemblies having one or more of different functionalities, geometries, or designs, with each of the different second head assemblies being adapted to be mounted to the second base assembly.

9. The system of claim 7, wherein
each of the different first head assemblies is provided in a first version for the driver side being on the left side of the vehicle and in a second version for the driver side being on the right side of the vehicle, and
each of second head assembly having different functionalities, geometries, or designs is provided in a first version for the passenger side being on the right side of the vehicle and in a second version for the passenger side being on the left side of the vehicle.

10. The system of claim 1, wherein
the first base assembly for the driver side being on the left side of the vehicle corresponds to the second base assembly for the passenger side being on the left side of the vehicle, and
the first base assembly for the driver side being on the right side of the vehicle corresponds to the second base assembly for the passenger side being on the right side of the vehicle, and
the first and second base assemblies are symmetrical to each other.

11. The system of claim 1, wherein the first and second head assemblies are symmetrical and have one or more of the same functionalities, geometries, or designs.

12. A vehicle comprising a system of rear view assemblies for a vehicle, comprising:
at least one first rear view assembly mounted to a driver side of an exterior of the vehicle to observe traffic conditions behind the driver side, comprising:
a first base assembly; and
a first head assembly mounted on the first base assembly, the first head assembly comprising a mirror element having a first size being a minimum size fulfilling a legal requirement for providing a mirror-based field of view on the driver side;
at least one second rear view assembly mounted on a passenger side of the exterior of the vehicle to observe traffic conditions behind the passenger side, comprising:
a second base assembly; and
a second head assembly mounted on the second base assembly, the second head assembly comprising a mirror element, the mirror element of the second rear view assembly mounted on the passenger side having a second size being the same minimum size as the first size of the mirror element of the first head assembly of the first rear view assembly mounted to the driver side; and
a vision system, comprising:
at least one vision sensor;
a display located in an interior of the vehicle, and
a controller;
wherein the vision sensor is arranged in the second rear view assembly to record a recorded image of the traffic conditions behind the passenger side, the recorded image based on the signals received by the at least one vision sensor;
wherein the controller includes software configured to calculate a display image to be displayed to a driver by the display, the calculation of the display image based on the recorded image and a legal requirement for the mirror-based field of view on the passenger side, the display configured to display the display image and having a field of view adapted to meet the legal requirement for the mirror-based field of view on the passenger side regardless of the reduced size of the second head assembly of the second rear view assembly so that the first rear view assembly on the driver side and the second rear view assembly on the passenger side are reduced to the first size, the first size being adapted to a smaller field of view on the driver side resulting in the smaller rear view assemblies carrying smaller mirror elements.

13. The vehicle of claim 12, wherein
the first base assembly and the second base assembly are attached to the body of the vehicle, and at least one of:
the first head assembly selected from the plurality of first heads assemblies is mounted on the first base assembly in an exchangeable manner, or
the second head assembly selected from the plurality of second head assemblies is mounted on the second base assembly in an exchangeable manner.

* * * * *